United States Patent [19]
Bochan

[11] 3,978,956
[45] Sept. 7, 1976

[54] DELAYED-ACTION CENTRIFUGAL CLUTCH TRANSMISSION

[75] Inventor: John Bochan, Louisville, Ky.

[73] Assignee: General Electric Company, Louisville, Ky.

[22] Filed: Aug. 26, 1974

[21] Appl. No.: 500,390

[52] U.S. Cl. .......................... 192/105 A; 192/85 F; 192/105 BA; 192/114 R
[51] Int. Cl.² .................. F16D 43/06; F16D 25/00; F16D 13/60
[58] Field of Search ........ 192/105 A, 105 F, 114 R, 192/85 F, 105 BA; 188/271

[56] References Cited
UNITED STATES PATENTS

| | | |
|---|---|---|
| 1,618,644 | 2/1927 | Dickson .......................... 192/105 A |
| 2,452,008 | 10/1948 | Wickwire et al. ................ 192/105 A |
| 2,555,772 | 6/1951 | Wickwire ........................ 192/105 A |
| 2,562,515 | 7/1951 | Wemp ............................ 192/105 A |
| 3,017,005 | 1/1962 | Muhlbeyer ..................... 192/105 BA |
| 3,812,944 | 5/1974 | Patel ............................. 192/105 BA |
| 3,850,276 | 11/1974 | Patel ............................. 192/105 BA |

Primary Examiner—Samuel Scott
Assistant Examiner—Lance W. Chandler
Attorney, Agent, or Firm—Frederick P. Weidner; Francis H. Boos

[57] ABSTRACT

A delayed-action transmission whereby mechanical coupling between a driven member and a driving member is effected by centrifugal force and the mechanical coupling is controllably delayed.

10 Claims, 6 Drawing Figures

DELAYED-ACTION CENTRIFUGAL CLUTCH TRANSMISSION

BACKGROUND OF THE INVENTION

In various apparatus which require power transmission elements, it is sometimes desirable to provide controlled delay between the actuation of the driving member and the coupling of the driving member to the driven member. One example is in the power transmission element of an automatic clothes washer where it is desirable to provide drain-down prior to a spin cycle.

In order to provide the delayed actuation feature for drain-down, some washers have incorporated a solenoid actuated disconnect between the motor and the washing apparatus with the motor adapted to drive a directly coupled pump. This method requires additional control equipment and maintenance.

Therefore, in order to avoid waste of equipment and manpower, it was believed that a centrifugal force controlled delayed-action transmission element could be utilized for coupling the driving member to the driven member of a washing machine to provide the desirable drain-down feature. Delayed action transmissions that will provide this desired action were known; for example, U.S. Pat. No. 3,017,005—Muhlbeyer. However, the construction of these heretofore utilized delayed-action transmissions were complex, required a large number of moving parts, and were not of the construction which was adapted for utilization in a relatively small household apparatus such as an automatic washing machine.

SUMMARY OF THE INVENTION

In accordance with this invention, a delayed-action transmission has a rotatable driven member associated with a housing. A diaphragm is connected to the housing and defines therewith a reservoir. A baffle plate extends from the outer periphery of the reservoir toward the housing axis through a portion of the reservoir and defines upper and lower reservoir portions. A fluid diverter has a volume chamber having an inlet in fluid communication with a lower reservoir portion and an outlet in fluid communication with an upper reservoir portion. Actuation means is associated with the driven member and the diaphragm for movement by the diaphragm in response to rotation of the housing. The actuating means is movable between a first position at which the driven member is disengaged from the housing and a second position in which the driven member is engaged with the housing and rotatable in response to rotation of the housing.

DETAILED DESCRIPTION OF THE INVENTION

Figure 1:
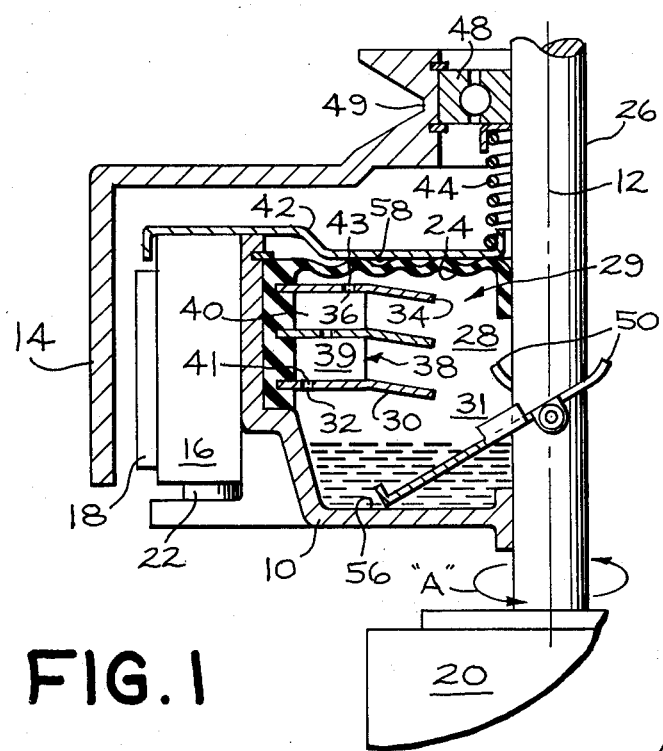
FIG. 1 is a diagrammatic partial sectional view of a portion of the apparatus of this invention with the clutch weight at the first position.
Figure 2:
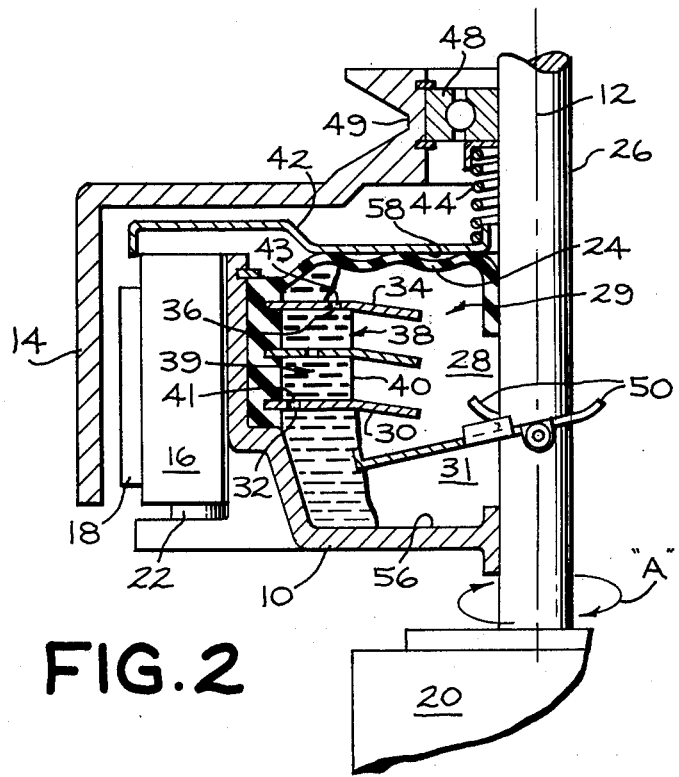
FIG. 2 is a diagrammatic partial sectional view of a portion of the apparatus of this invention with the latch plate being forced upwardly by the diaphragm.
Figure 3:
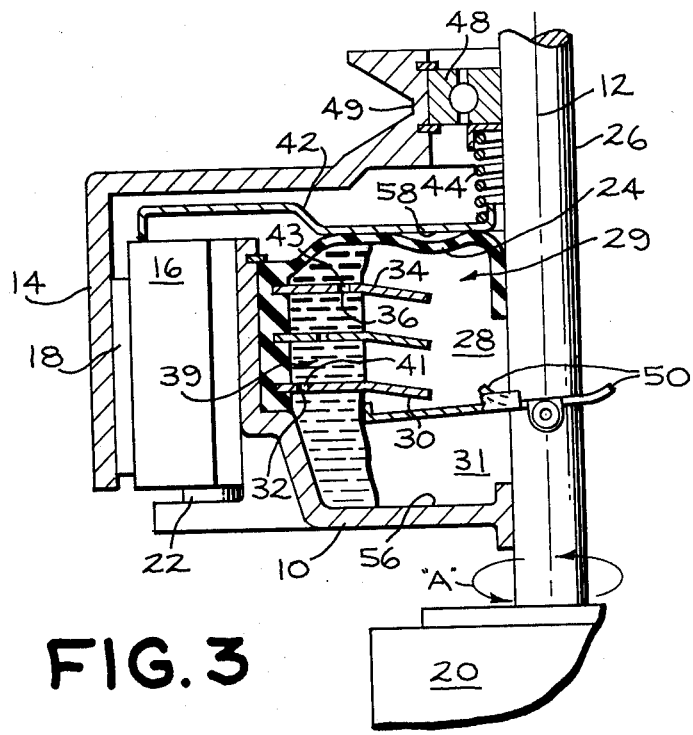
FIG. 3 is a diagrammatic partial sectional view of a portion of the apparatus of this invention with the clutch weight at the second position.

In accordance with the embodiments of FIGS. 1–3, a housing 10 having an axis 12 is coaxially nested within a clutch drum 14. A clutch weight 16 has a liner 18 on the outer surface for frictional engagement with the drum 14 for frictionally coupling the drum 14 with the motor 20 through the housing 10.

The clutch weight 16 is pivotally connected by pin 22 to the housing 10 for movement between a first position (FIG. 1) in which the liner 18 is spaced from the clutch drum 14 and a second position (FIG. 3) in which the liner is forcibly contacting the clutch drum 14 in response to rotation of the housing 10, as hereafter more fully described.

A diaphragm 24 is connected to the housing 10 and to a shaft 26 of the motor 20. The diaphragm 24 and the housing 10 define an annular fluid reservoir 28.

A lower baffle plate 30 is connected to the housing 10 at the outer periphery of the reservoir 28 and extends inwardly along the housing 10 toward the housing axis 12. An orifice 32 is formed through the lower baffle plate 30 for the passage of fluid therethrough.

An upper baffle plate 34 is connected to the housing 10 at the outer periphery of the reservoir 28 adjacent the diaphragm 24 and extends inwardly along the diaphragm 24 toward the housing axis 12. An orifice 36 is formed through the upper baffle plate 34 for the passage of fluid therethrough.

It is preferred that the baffle plates 30, 34 are Each continuous, encompass the housing axis 12, and are generally downwardly depending toward and spaced from the motor shaft 26. The baffle plates 30, 34 are connected to the housing 10 via a portion of the diaphragm 24, but can be directly connected to the housing 10 by other means.

A fluid diverter 38 having a volume chamber 39 having an inlet 41 and an outlet 43 (FIG. 1) is connected to and positioned between the baffle plates 30, 34 with the inlet 41 and outlet 43 of the diverter 38 being in fluid communication with the respective orifices 32, 36.

A latch plate 42 is associated with the diaphragm 24 and the clutch weight 16 for releasably maintaining the clutch weight 16 at the first position. The latch plate 42 is movable by the diaphragm 24 in response to rotation of the housing 10 for releasing the clutch weight 16 for movement from the first position (FIG. 1) toward the second position (FIG. 3). The latch plate 42 is biased toward the diaphragm 24 by biasing means, for example, a helically coiled spring 44.

Figure 4:
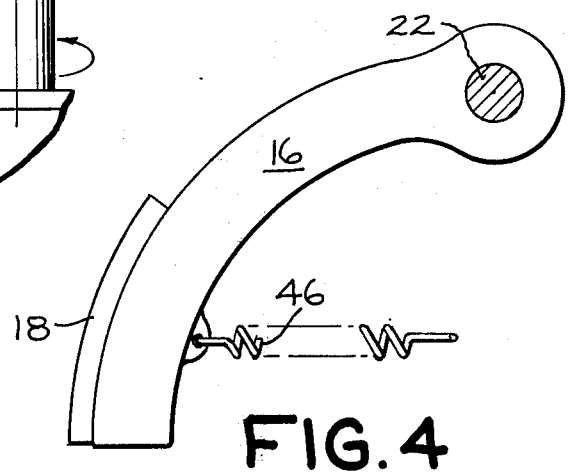
FIG. 4 is a diagrammatic top view of the clutch weight.

Referring to FIG. 4, a biasing means 46, such as a helically coiled spring for example, is connected to the clutch weight 16 for biasing the clutch weight 16 in a direction toward the first position.

Figure 5:
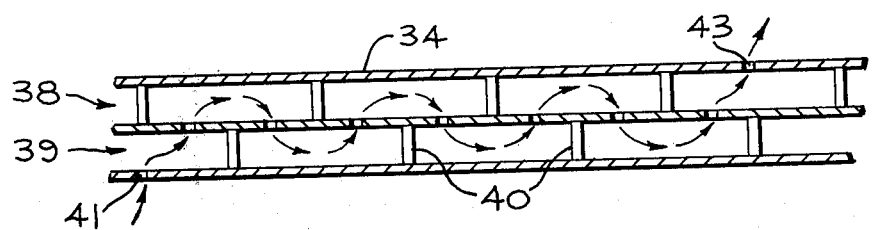
FIG. 5 is a diagrammatic sectional view of a portion of the fluid diverter.

Referring to FIG. 5, the volume chamber 39 of the fluid diverter 38 can have baffle elements 40 therein for providing a tortuous fluid pathway between the inlet 41 and outlet 43. It should be understood that FIG. 5 has been horizontally expanded to better show elements 40.

Referring to FIGS. 1–3 and 6, guide vanes 50 can be connected to an inner portion of the housing 10 or to the shaft 26. The guide vanes 50 are pivotally connected and extend downwardly and outwardly through the reservoir 28. It is preferred that there be a plurality of guide vanes 50 symmetrically positioned about the housing axis 12 for balance during rotation of the housing 10. Each guide vane 50 has opposed edges 52, 54 and are each commonly, angularly disposed relative to first and second ends 56, 58 of the reservoir 28.

In the embodiment of FIGS. 1–3, the clutch drum 14 is considered to be the driven member and the driving member is considered to comprise the clutch weight 16, biasing means 44 of the clutch weight (FIG. 5), and the latch plate 42. The driven member can be similar to the latch plate and comprise a first disc and the actuating member can comprise a second disc matable with the first disc forming a disc-type clutch. It should also be understood that the driven member and the actuation member can be of any construction engageable in response to rotation of the housing with associated movement of the diaphragm.

It should be understood that a single baffle plate can be utilized. Whether a single baffle plate or a multiplicity of baffle plates are utilized, said baffle plate or plates separate the reservoir 28 into upper and lower reservoir portions 29, 31 for directing fluid through the chamber 39 of the fluid diverter 38. Where a single baffle plate is utilized, the inlet and outlet 41, 43 of the volume chamber 39 can be utilized for controlling the rate of flow from the lower reservoir portion 31 to the upper reservoir portion 29.

In the operation of the apparatus of this invention, with reference to the driving and driven structure of FIGS. 1–3, the motor 20 rotates housing 10 within the stationary clutch drum 14 in the direction shown by arrow A. As the housing 10 rotates, liquid in the reservoir 28 is moved from the "at rest" position in the lower portion 31 of the reservoir 28 (FIG. 1) toward the outer periphery of the reservoir by centrifugal force (see FIG. 2).

As the housing 10 continues to rotate, the pressure of the confined liquid increases and is forced through the orifices 32, 41 through the volume chamber 39 of the fluid diverter 38, through orifice 43, 36, and into contact with the diaphragm 24 at which location the fluid pressure is exerted against and expands the diaphragm 24 upwardly into forcible contact with the latch plate 42.

As the volume of liquid between the upper baffle plate 34 and diaphragm 24 increases, the pressure exerted on the latch plate 42 increases to a value sufficient to overcome the force of the biasing means 44 and thereby cause the latch plate 42 to move upwardly. This movement of the latch plate 42 continues as more fluid is discharged from orifice 36 and the latch plate 42 is moved to the position shown in FIG. 3, thereby releasing the clutch weight 16 to pivot outwardly in response to centrifugal forces and forcibly engage the clutch drum 14 in opposition to the forces subjected on the clutch weight 16 by the biasing means 46. Frictional forces between the clutch weight liner 18 and the clutch drum cause the clutch drum to rotate about the motor shaft 26 on bearing 48. A belt can be positioned in groove 49 to drive associated equipment in response to rotation of the clutch drum 14.

Upon termination of rotation of the housing 10, the liquid passes between the baffle plates 30, 34 and the shaft 26 and returns to the "at rest" position as shown in FIG. 1.

Figure 6:
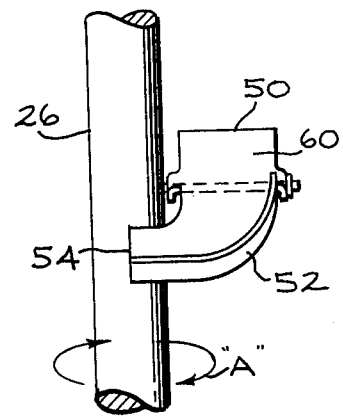
FIG. 6 is a side view of the guide vanes of this invention.

Referring to FIG. 6, it should be noted that owing to the angular construction of guide vanes 50, if the housing 10 is rotated in a direction opposed to the rotational direction of arrow A, the second edge 54 associated with the inclined upper surface 60 will cause at least a portion of the liquid to be thrown upwardly, bypass the baffles and fluid diverter and be forced against the diaphragm 24. By so providing and constructing the guide vanes 50, the housing can be reversed and the delayed-action time of the transmission can be reduced.

By guide vane 50 construction associated with housing acceleration, the delay period can be reduced to an extremely short time. Conversely, by reducing the orifice size and increasing the size of the volume chamber, the delay period can be increased to an extremely long time.

One skilled in the art can readily size the orifices 32, 36 and/or 41, 43 and the volume chamber 39 of the fluid diverter 38 after other variables of the apparatus have been determined.

By so constructing the transmission of this invention, the time delay can be varied widely, wearing parts are maintained at a low value, and the construction is simple and easy to maintain.

Other modifications and alterations of this invention will become apparent to those skilled in the art from the foregoing discussion, and it should be understood that this invention is not to be unduly limited thereto.

What is claimed is:

1. A delayed-action transmission, comprising:
   a rotatable driven member;
   a rotatable housing having an axis and being positioned adjacent the driven member;
   a diaphragm connected to the housing and defining therewith a reservoir;
   a baffle plate extending through a portion of the reservoir from the outer periphery of the reservoir toward and spaced from the housing axis, said baffle plate being movable with the housing and defining upper and lower reservoir portions;
   a fluid diverter having a volume chamber having an inlet in fluid communication with the lower reservoir portion and an outlet in fluid communication with the upper reservoir portion; and
   actuation means associated with the driven member and the diaphragm for movement by the diaphragm in response to rotation of the housing, said actuating means being movable between a first position at which the driven member is disengaged from the housing and a second position at which the driven member is engaged with and rotatable in response to rotation of the housing.

2. A transmission, as set forth in claim 1, wherein the baffle plate is positioned adjacent the inlet end of the fluid diverter and has an orifice in fluid communication with the inlet of said fluid diverter.

3. A transmission, as set forth in claim 2, including a second baffle plate having an orifice in fluid communication with the outlet of said fluid diverter, said second baffle plate extending through the reservoir from the outer periphery of the reservoir toward the housing axis and being movable with the housing.

4. A transmission, as set forth in claim 1, wherein the fluid diverter has a plurality of baffles therein for providing a tortuous fluid pathway between ends thereof.

5. A transmission, as set forth in claim 1, including a guide vane pivotally connected adjacent the axis and extending outwardly through the reservoir, said guide vane being angularly disposed relative to first and second ends of the reservoir.

6. A transmission, as set forth in claim 1, wherein the inner end of the baffle is spaced from adjacent structure.

7. A transmission, as set forth in claim 1, wherein the baffle plate encompasses the housing axis.

8. A transmission, as set forth in claim 1, wherein the driven member is a clutch drum and the actuation means comprises a clutch weight assembly having a liner on the outer surface thereof and being pivotally connected to the housing for movement between a first position at which the liner is spaced from the clutch drum and a second position at which the liner is forcibly contacting the clutch drum in response to the rotation of the housing;

means for biasing the clutch weight toward the first position; and a latch plate associated with the diaphragm and the clutch weight for releasably maintaining the clutch weight at the first position, said latch plate being movable by the diaphragm in response to rotation of the housing for releasing the clutch weight for movement from the first toward the second position.

9. A transmission, as set forth in claim 8, including biasing means for urging the latch plate toward the diaphragm.

10. A transmission, as set forth in claim 8, wherein the latch plate has spring means for biasing the clutch plate in a direction toward latching engagement with the clutch weight.

* * * * *